Dec. 8, 1936.   G. W. MUDD   2,063,183
MACHINE FOR FEEDING CAN ENDS
Original Filed June 30, 1930   2 Sheets-Sheet 1
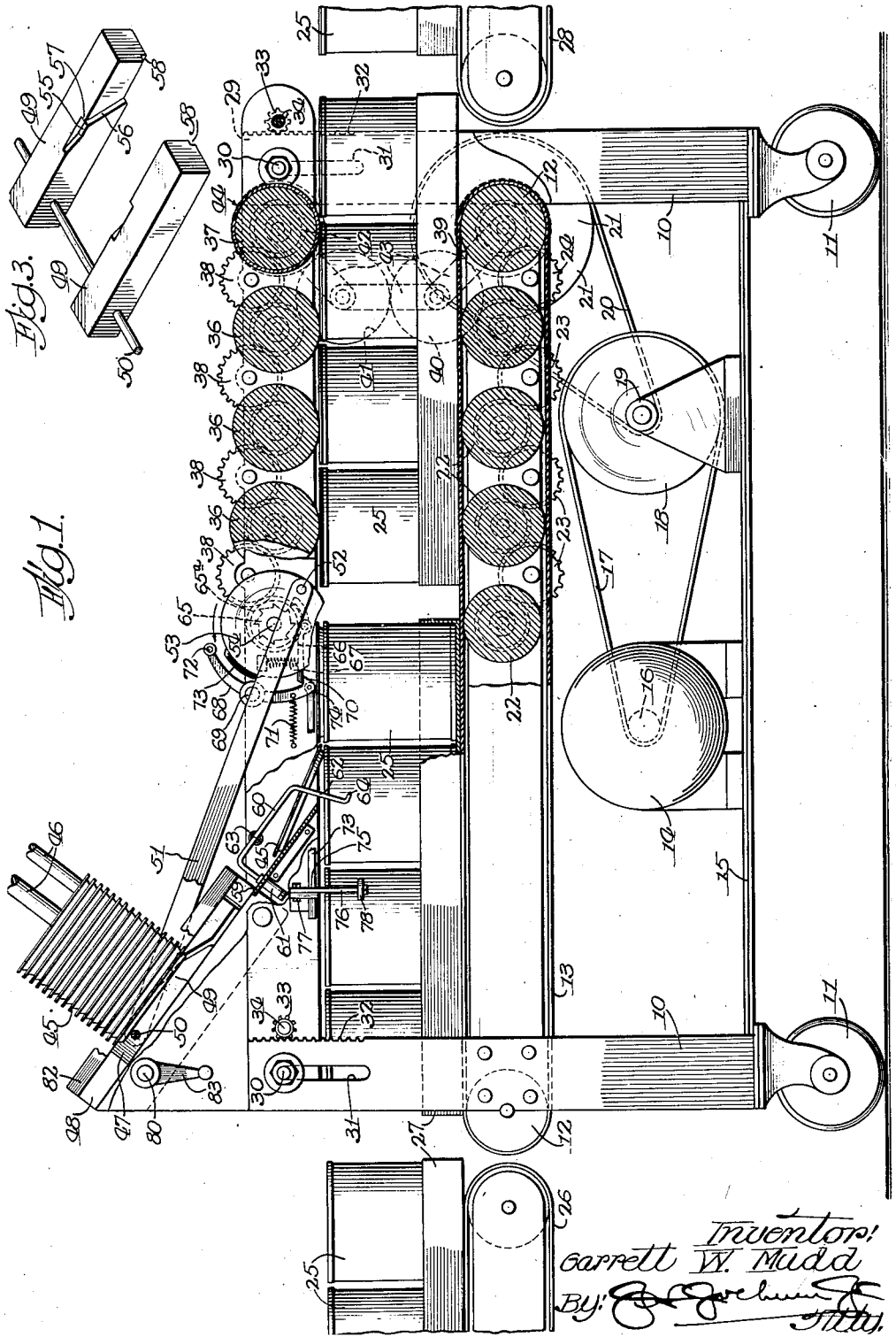
Inventor:
Garrett W. Mudd
By [signature]

Dec. 8, 1936. G. W. MUDD 2,063,183
MACHINE FOR FEEDING CAN ENDS
Original Filed June 30, 1930 2 Sheets-Sheet 2
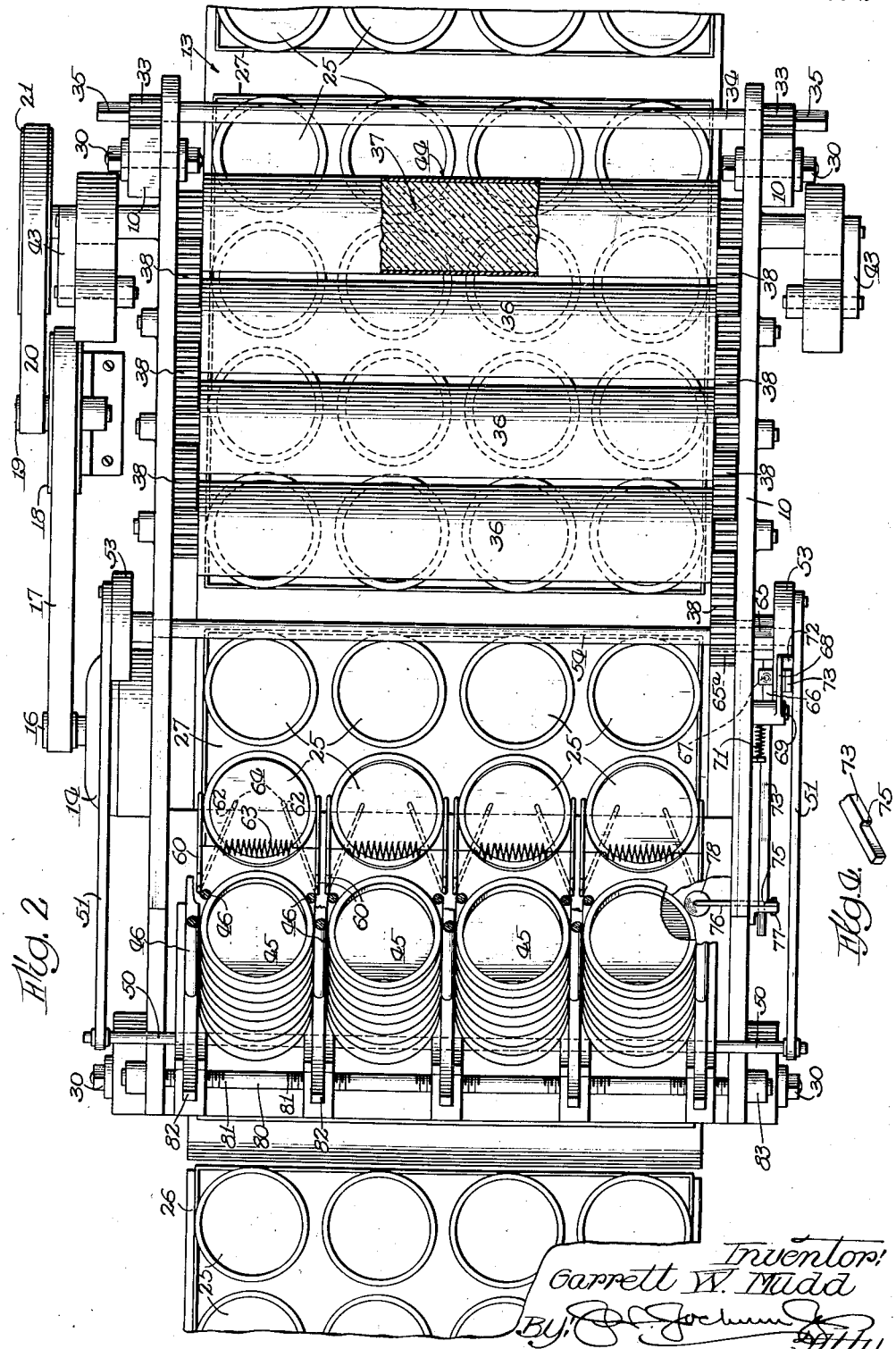

Patented Dec. 8, 1936

2,063,183

UNITED STATES PATENT OFFICE 2,063,183

MACHINE FOR FEEDING CAN ENDS

Garrett W. Mudd, Chicago, Ill.

Refiled for abandoned application Serial No. 464,753, June 30, 1930. This application September 21, 1935, Serial No. 41,557

12 Claims. (Cl. 113—114)

This application is for the same subject matter as my allowed application filed June 30, 1930 Serial Number 464,753.

This invention relates to improvements in machine for feeding can ends, and one of the objects of the invention is to provide improved means for feeding the can ends from the bottom of a pile or stack, and for delivering them to and placing them upon the can, and subsequently and gradually forcing the can ends into telescoping relation with the cans as the latter are advanced.

A further object is to provide improved means controlled by the cans for controlling the delivery of the ends to the cans.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view partly in elevation, partly in longitudinal section and partly broken away, of a machine of this character constructed in accordance with the principles of this invention.

Figure 2 is a top plan view of Figure 1, with parts omitted and with parts broken away.

Figure 3 is a detail perspective view of the ejector for removing the cans from the supply.

Figure 4 is a detail in perspective of connection in the tripping arrangement.

Referring more particularly to the drawings the numeral 10 designates generally a supporting structure which may be of any desired size and configuration and is preferably supported upon rollers or casters 11 by means of which the same may be transported.

Suitably mounted upon the supporting structure are pulleys 12 over which an endless conveyor 13 passes and upon which conveyor cans are delivered into the machine.

The conveyor is operated continuously in any desired or suitable manner preferably by means of a motor 14 and mounted upon a supporting platform 15 upon the structure 10. To the shaft of the motor 14 is a pulley 16 over which an endless belt 17 passes and which also passes over a pulley 18 to which is connected a pulley 19, the pulleys 18 and 19 forming a speed reducer. Over the pulley 19 passes an endless belt 20 which also passes over a pulley 21 which is connected with the pulley 12 for rotation therewith so that by the operation of the motor 14 the endless conveyor 13 will be actuated.

Arranged beneath the upper run of the conveyor 13 are a series of rollers 22 extending across the framework and these rollers are driven from each other through the medium of intermediate gears 23 meshing with gears on the respective adjacent rollers 22.

The pulley 12 has connected with it a gear which also meshes with a gear 24 included in the train of gears which operate the rollers 22.

The rollers 22 serve as a supporting means for the cans and to resist pressure, in a manner to be set forth.

The cans 25 are supplied to the conveyor 13 in any suitable manner, preferably from another conveyor 26 and the cans 25 are arranged in a portion 27 of a carton.

From the conveyor 13 the cans are delivered to another conveyor 28 to be conveyed away from the machine.

Adjustably supported by the framework 10 is a supplemental frame 29 connected to the uprights of the frame 10 preferably by means of bolts 30 passing through slots 31. The uprights of the supporting frame are provided with rack teeth 32 with which gears 33 carried by the supplemental frame mesh, and these gears 33 on opposite sides of the frame are connected by a shaft 34, the end of the shaft being angular in cross section as at 35 for the reception of a tool or implement by means of which the respective gears 33 may be rotated to raise and lower the supplemental frame 29 with respect to the main supporting frame and the endless conveyor 13 and rollers 22. The fastening devices 30 are loosened to permit of such adjustment and are then tightened so as to hold the parts in their adjusted position. This adjustment of the supplemental frame 29 is provided to compensate cans of varying heights.

Extending across the supplemental frame 29 are a series of rollers 36—37 which are arranged parallel with the rollers 22 and these rollers 36—37 are connected by intermediate gears 38, whereby one may be driven from the other and the series of rollers 36—37 are driven from the pulley 12, preferably through the medium of a gear 39 connected with the pulley, which meshes with a gear 40 that in turn meshes with a gear 41, the latter meshing with a gear 42 carried with the roller 37. These gears 40 and 41 are supported by means of links 43 pivoted together and the links are of such a length as to permit of the adjustment of the supplemental frame 29 with respect to the main frame 10 while maintaining the gears in mesh.

The rollers 36—37, any number of which may be provided are arranged so that their axes will be in different horizontal planes, that is the rollers 36 will be supported one in a slightly lower plane than the next adjacent roller, with respect to the endless conveyor 13 and the surface of the rollers 22, for a purpose to be set forth.

The roller 37 is preferably constructed of a resilient body portion such as rubber or the like, and is provided with a shell 44 constructed of any suitable yielding material such as galvanized iron or the like, of any desired thickness so as to yield to prevent injury and to prevent the can and top from being wedged, the roller 37 being the last roller of the series.

The can tops or ends 45 which are adapted to be supplied to the cans are superposed and are held by means of a suitable holder 46, the can tops being preferably inclined. An ejector 47 is reciprocable in a guideway 48 and the ejector is preferably arranged to operate in an inclined plane.

The ejector preferably comprises spaced body members 49 connected together by means of a bar or rod 50 and connected to the rod 50 at the opposite ends of the machine are links 51 of any desired length, the forward end of the links being pivotally connected as at 52 with discs 53, which are connected with a shaft 54 and on opposite sides of the machine. The members 49 of the ejector are provided with cut away portions 55 on their proximate faces and inclined grooves or slots 56 are provided in the lateral faces of the members 49 communicating with the cut away portion 55 to form a ledge or portion 57 at the top of the inclined groove 56. The lower portion of the groove 56 is cut away as at 58.

The can tops or ends 45 are supported upon the members 49 and the flange of the lowermost end will rest in the cut away portion 55 and will drop thereinto when the ejector 47 starts to move backwardly. Upon a further movement of the ejector in the same direction the ledge or portion 57 of the slot 56 will pass over the flange of the can end so that the flange will travel in the inclined groove 56 to be delivered from the groove through the cut away portion 58 and will then be delivered to a support 59 which is also preferably inclined. Arms 60 are arranged on each side of the respective supply of can ends and these arms are preferably of a substantially inverted U shaped configuration being pivotally mounted in suitable bearings 61 by one end.

The forward ends 62 of the arms 60 depend downwardly and are adapted to be engaged by the sides of the advancing can 25. A spring 63 tends normally to move the forward ends of each pair of arms 60 towards each other (see particularly Figure 2) so as to arrest the movement of the can end 45 upon the support 59 and hold the same in position until an advancing can passes between the arms 62 to separate the latter against the stress of the spring 63, thereby releasing the can end so that it will be deposited upon the advancing can as shown in Figure 1 and over an opening in the can end into which the top or end is adapted to be telescoped.

The arms 62 are provided with forwardly extending portions 64 to insure holding the arms 60 separated a sufficient length of time to permit the can end 45 to pass between the portions 62 on the arms.

When the can end is deposited upon the top of a can as shown in Figure 1, the can with its end is advanced by the conveyor 13 so as to enter the rollers 36—37 and as these rollers 36—37 are arranged at different heights with respect to the conveyor 13, it will be manifest that as the rollers 36 are positively driven and as the cans 25 are advanced, the can end 45 will be gradually forced into telescoping relation with the respective cans, and as the capped can passes from beneath the roller 37 it will be delivered on to the conveyor 28.

The ejector 47 is adapted to be intermittently operated by means of the links 51 and the disc 53. To that end there is mounted upon the shaft 54 a toothed wheel 65, which has connected with it a gear 65ᵃ to rotate therewith and which gear 65ᵃ meshes with one of the intermediate gears 38. Pivotally mounted upon one of the discs 53 adjacent the toothed wheel is a locking dog 66, a spring 67 being provided which tends normally to move the locking dog 66 into locking engagement with the toothed wheel 65 so that the disc 53 will be locked to the shaft 54 to reciprocate the ejector.

Inasmuch as the ejector should be intermittently operated, means are provided for unlocking or tripping the dog 66 to release the disc 53 from the shaft 54.

To accomplish this a tripping member 68 is provided which is pivotally mounted intermediate its ends as at 69 and is provided with a shoulder 70 at its free end, a spring 71 operating to normally hold the shoulder 70 out of the path of movement of a portion of the locking dog 66. Connected with the other end of the member 68 is an anti-friction roller 72. A bar or rod 73 is pivotally connected as at 74 with the tripping member 68 and this member 73 is provided with a shoulder 75, in front of which a member 76 is adapted to be positioned, and which member 76 is pivotally supported as at 77. An anti-friction roller 78 is carried by the member 76 and is adapted to be engaged by the sides of the cans to swing the member 76 about its pivot 77 so as to pass out of engagement with the shoulder 75 on the bar or rod 73 to release the latter, so that the spring 71 will swing the trip member 68 to a position that the shoulder 70 will be moved out of the path of movement of the dog 66 to release the latter, so that the spring 67 will move the dog 66 into locking engagement with the member 65 to lock the ejector for operation.

The parts will assume this position until the can has passed the roller 78 on the member 76 and just at that time the cam 79 will engage the roller 72 on the trip member 68 to move the latter against the stress of the spring 71, thereby positioning the shoulder 70 in the path of movement of the dog 66 and the shoulder 75 on the bar or rod 73 so that the member 76 will engage behind the shoulder 75 for locking the trip member 68 in a position to trip the dog 66. When the dog 66 is thus tripped the ejector 49 will be unlocked and will remain inactive.

In order to compensate can ends of varying diameters, the members 46 which constitute the holders for maintaining the supply of can ends are adapted to be laterally adjusted with respect to each other, and to that end there is provided a shaft 80 provided with threaded portions 81 that pass through supports 82 which carry the members 46. A crank 83 is connected with the shaft 80 for rotating it. The threads 81 on the shaft 80 are so arranged with respect to each other and the respective members 82 that by rotating the shaft 80 in one direction the members 82 will be separated and by rotating them in the opposite direction they will be drawn together.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a machine of the character described, means for maintaining a supply of superposed can ends, means for advancing the cans, a positively actuated ejector for removing the lowermost end from said supply, means actuated by the cans for rendering the ejector active, additional means subsequently controlled by the can to which the end is to be supplied for controlling the delivery of a previously ejected end to said can, and a series of rollers arranged adjacent the path of movement of the can with the end supplied thereto and beneath which the can and end pass for compressing the end upon the can, the axes of said rollers being arranged in different horizontal planes.

2. In a machine of the character described, means for maintaining a superposed supply of can ends, means for feeding the cans, a positively actuated but normally inactive ejector for successively removing the lowermost end from said supply and for causing the removed end to be positioned to be delivered to a can, holding means for maintaining the end in the last said position, means separate from said ejector and controlled by the advancement of the cans for rendering the said ejector active, and means also controlled by the advancement of the cans for actuating the said holding means for releasing the end held thereby to be delivered to the can.

3. In a machine of the character described, means for maintaining a superposed supply of can ends, means for feeding the cans, normally inactive and positively actuated reciprocable ejector for successively removing the lowermost end from said supply and for causing the removed end to be positioned to be delivered to a can, holding means for maintaining the end in the last said position, means controlled by the advancement of the cans for rendering the said removing means active, and means separate from the said ejector, also controlled by the advancement of the cans for actuating the said holding means for releasing the end held thereby for delivery to the can.

4. In a machine of the character described, means for maintaining a supply of superposed can ends, means for advancing the cans, an ejector for removing the lowermost end from said supply, normally inactive operating means for the said ejector, means controlled by the feeding movement of the cans for rendering said operating means active, and yieldable means arranged in the path of movement of the end when the latter is removed from said supply for positioning and holding the end to be delivered to a can, a portion of the last said means being arranged in the path of movement of the can to be shifted thereby to release said end to the can.

5. In a machine of the character described, means for maintaining a supply of superposed can ends, means for advancing the cans, means for removing the lowermost end from said supply, normally inactive operating means for the last recited means, means controlled by the feeding movement of the cans for rendering said operating means active, a pair of cooperating yieldable means arranged in the path of movement of the end when the latter is removed from said supply for positioning and holding the end to be delivered to a can, and connected with said elements and between which the can passes and which are engaged and shifted by the can as it is advanced for separating them to release the said end to the can.

6. In a machine of the character described, means for maintaining a supply of superposed can ends, means for advancing the cans, means for engaging and removing the lowermost end from said supply, an actuating member normally inactive with respect to the last said means, means controlled by the advancing movement of the cans for automatically connecting the said actuating member with the said removing means to render the latter active, a pair of yieldable members arranged in the path of movement of the can end when the latter is removed from said supply for arresting the end and for positioning and holding it to be delivered to the can, and means whereby an advancing can will separate the said member to release the said end to be delivered to the can.

7. In a machine of the character described, means for maintaining a supply of superposed can ends, an ejector for removing the lowermost end from said supply, spaced members adapted to be separated to permit the ends to pass therebetween after they have been removed from said supply, means tending normally to maintain said members against separation, means connected with said members and between which last said means the advancing can will pass to be engaged thereby to separate said members to release the can end, an actuator, and means operable at a predetermined time in the cycle of operation of the machine for connecting the actuator with the said ejector.

8. In a machine of the character described, means for maintaining a supply of superposed can ends, an ejector for removing the lowermost end from said supply, a rotatable actuator, means embodying a locking device for connecting the ejector with said actuator, a trip, means for positioning said trip in the path of movement of said locking device for rendering the latter inactive to disconnect the ejector from said actuator, means for locking said trip in the last said position, and means responsive to the advancement of the cans for releasing the said trip to render the locking device active.

9. In a machine of the character described, means for maintaining a supply of superposed can ends, an ejector for removing the lowermost end from said supply, a rotatable actuator, means embodying a locking device for connecting the ejector with said actuator, a trip, means for positioning said trip in the path of movement of said locking device for rendering the latter inactive to disconnect the ejector from said actuator, means for locking said trip in the last said position, means responsive to the advancement of the cans for releasing the said trip to render the locking device active, and means responsive in its operation to the locking of the actuator with the ejector for repositioning the said trip in the path of movement of said locking device to disconnect the actuator from said ejector.

10. In a machine of the character described, means for maintaining a supply of superposed can ends, an ejector for removing the lowermost end from said supply, a rotatable actuator, means embodying a locking device for connecting the ejector with said actuator, a trip, means for positioning said trip in the path of movement of said locking device for rendering the latter inactive to disconnect the ejector from said actuator, means for locking said trip in the last said position, means responsive to the advancement of the cans for releasing the said trip to render the locking device active, and means embodying a rotatable cam device responsive in its operation to the locking of the actuator with the ejector for repositioning the said trip in the path of movement of said locking device to disconnect the actuator from said ejector.

11. In a machine of the character described, means for advancing the cans, means for holding a supply of ends, means for removing the ends separately from said supply, means for receiving and holding the ends as they are removed from the supply, the last said means embodying spaced members between which the ends are passed to be gripped by their edges between the members, means normally tending to move the members together, and means for separating the members to release the end held thereby, the last said means embodying portions of the members extending below the can end and between which members the advancing can passes to be engaged by a can and separated thereby.

12. In a machine of the character described, means for maintaining a superposed supply of can ends, means for feeding the cans, normally inactive means for successively removing the lowermost end from said supply and for causing the removed end to be positioned to be delivered to a can, yieldable cooperating members between which the can end is positioned to be held thereby, means controlled by the advancement of the cans for rendering the said removing means active, means connected with said members to be engaged by the advancement of a can for separating the said holding members for releasing the end held thereby to be delivered to the can, and means for compressing the said end upon the can as they are advanced together.

GARRETT W. MUDD.